United States Patent [19]
Steinke et al.

[11] Patent Number: 5,999,423
[45] Date of Patent: Dec. 7, 1999

[54] VOLTAGE CONVERTER WITH FILTER ARRANGEMENT

[75] Inventors: Jürgen Steinke, Albbruck, Germany; Christian Stulz, Zürich, Switzerland

[73] Assignee: Asea Brown Boveri AG, Baden, Switzerland

[21] Appl. No.: 09/137,540

[22] Filed: Aug. 21, 1998

[30] Foreign Application Priority Data

Aug. 23, 1997 [DE] Germany ............................ 197 36 786

[51] Int. Cl.⁶ ............................................. H02M 1/12
[52] U.S. Cl. ................................. 363/40; 363/47; 363/95
[58] Field of Search ................................... 363/39, 40, 41, 363/44, 45, 46, 47, 37, 89, 95, 97; 307/105; 323/205, 207, 208

[56] References Cited

U.S. PATENT DOCUMENTS 5,526,252   6/1996   Erdman ..................................... 363/41
5,619,079   4/1997   Wiggins et al. ..................... 307/105 X

FOREIGN PATENT DOCUMENTS 0 682 401 A1   11/1995   European Pat. Off. .

*Primary Examiner*—Y. J. Han
*Attorney, Agent, or Firm*—Oblon, Spivak, McClelland, Maier & Neustadt, P.C.

[57] ABSTRACT

A voltage converter having a voltage intermediate circuit and an invertor connected to the output of the voltage intermediate circuit. The invertor produces a three-phase AC voltage at its output and is connected to the output terminals of the voltage converter by a filter arrangement. The filter arrangement includes a filter inductor connected in series with the output terminal and the filter capacitor connected between the output terminal and a common capacitor star point. Attenuation of the DC system is achieved by having the capacitor star point connected to the voltage intermediate circuit by way of an RC element having a capacitor and a resistor.

8 Claims, 2 Drawing Sheets

VOLTAGE CONVERTER WITH FILTER ARRANGEMENT

BACKGROUND OF THE INVENTION

1. Field of the Invention

The present invention relates to the field of power electronics. It concerns a voltage converter having a voltage intermediate circuit and an invertor following on from the voltage intermediate circuit, which invertor produces a three-phase AC voltage at its outputs and is connected to the output terminals of the voltage converter via a filter arrangement, the filter arrangement having in each case a filter inductor, connected in series with the output terminal, and a filter capacitor which is connected between the output terminal and a common capacitor star point.

Such a voltage converter is disclosed, for example, in the printed publication EP-A1-0 682 401 (FIG. 1).

2. Discussion of Background

In order to achieve generally loss-free filtering of the output voltage from a converter having a voltage intermediate circuit (voltage converter), use is nowadays made of a filter comprising filter inductors and filter capacitors (LC filter). A possible embodiment is one which has filter capacitors connected in star formation, as described in the printed publication mentioned in the introduction and illustrated in FIG. 1. In this case, the voltage converter 39 shown in FIG. 1 comprises a voltage intermediate circuit 11 having two terminals 12 and 13, between which intermediate circuit capacitors 14, 16 are arranged and have a center tap 15 or else can be one capacitor. The voltage intermediate circuit 11 is followed on by an invertor 10 (equipped with power semiconductors) which outputs the generated polyphase AC voltage at corresponding output terminals 20, 21 and 22 via a filter formed from filter inductors 17, 18 and 19 and filter capacitors 23, 24 and 25. The filter inductors 17–19 are in each case connected in series with the output terminals 20–22. The filter capacitors 23–25 are connected between the output terminals 20–22 and a common capacitor star point 26.

In another known filter circuit, which is shown in FIG. 2, the filter capacitors 27, 28, 29 are delta-connected, i.e. connected between two of the output terminals 20–22 in each case.

In a further filter circuit, which is shown in FIG. 3 and is likewise disclosed in the printed publication mentioned in the introduction (FIG. 3), three respective filter capacitors 30–32 and 33–35 jointly provide feedback from the output terminals 20–22 to the terminals 12 and 13 of the voltage intermediate circuit 11.

The circuits shown in FIGS. 1 and 2 filter only the pure three-phase voltage systems. The DC system, on the other hand, is not filtered. Sudden voltage changes in the DC system are passed on unimpeded to the connection terminals 20–22 of the load if the star point of the load or, in FIG. 1, the capacitor star point 26 is not grounded. The two measures cannot be used in a general manner, however.

The circuit shown in FIG. 3 does not have these disadvantages. Its own disadvantage is of a system-related nature and comes to bear when the conditions of use for the filter are such that, with no additional measures, free oscillations are continually excited. Loss-free attenuation of these free oscillations can be achieved only by using a controller which intervenes in the switching sequence of the invertor 10. Nowadays, the switching sequence of the invertor 10 is usually determined by a control computer which uses the load conditions as a basis for establishing the switching commands for the power switches in the invertor. The control computer usually operates in only two coordinates, on account of the symmetry of the output. This makes it possible to determine the switching states of the three phases. From the viewpoint of the filter in the circuit shown in FIG. 3, the three phases are decoupled. Any resonance control must therefore be carried out with three control loops which act independently. This means that it is no longer a simple matter to integrate resonance correction into load control. However, as both parts of the control have access to the same manipulated variable, they must not operate in a decoupled manner. In all cases, a considerable amount of additional effort is required in order to resolve this conflict. A further disadvantage of the circuit shown in FIG. 3 is the high additional current loading of the intermediate circuit capacitors and the invertor, which is caused by the filter capacitors being subjected to charge reversal by the DC voltage system, particularly at low switching frequencies of the invertor semiconductor switches. The same disadvantages also arise if the capacitor star point 26 in the circuit shown in FIG. 1 is connected directly to one of the terminals 12, 13 or the center tap 15.

SUMMARY OF THE INVENTION

Accordingly, one object of the invention is to modify a voltage converter of the type mentioned in the introduction in such a way that the DC system is also filtered effectively without any great amount of additional effort.

The object is achieved in a voltage converter of the type mentioned in the introduction by virtue of the fact that the capacitor star point is connected to the voltage intermediate circuit via an RC element having a capacitor and a resistor. The capacitor of the RC element eliminates steady-state currents through the resistor of the RC element. The resistor of the RC element serves as a damping resistor and attenuates the oscillations.

A preferred embodiment of the circuit according to the invention is distinguished by the fact that the capacitance of the capacitor is very much lower than the capacitance of the filter capacitors. This means that the resonance control for the main filter having the filter inductors and filter capacitors is not affected. The gradient of the sudden voltage changes in the DC system is effectively limited, however. With a suitable design, the high-frequency resonance is effectively attenuated at the same time, without provoking unacceptably high losses.

Other embodiments can be found in the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
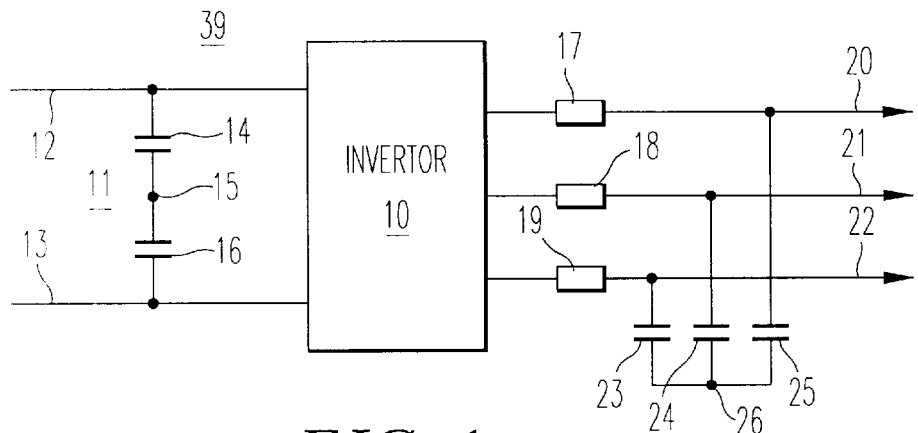
FIGS. 1–3 show various filter circuits for voltage converters based on the prior art.
Figure 2:
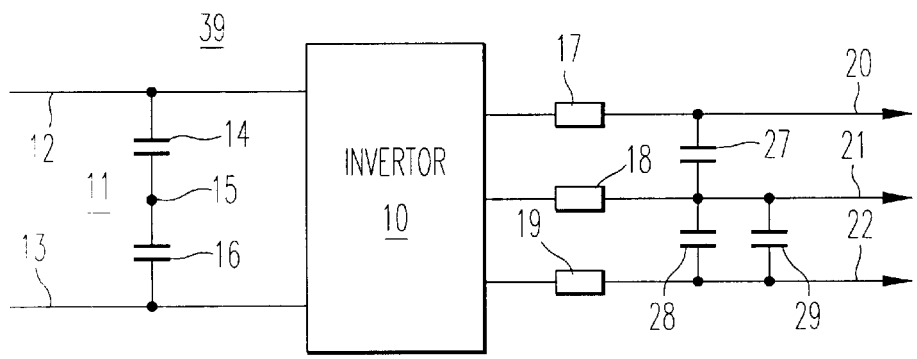
Figure 3:
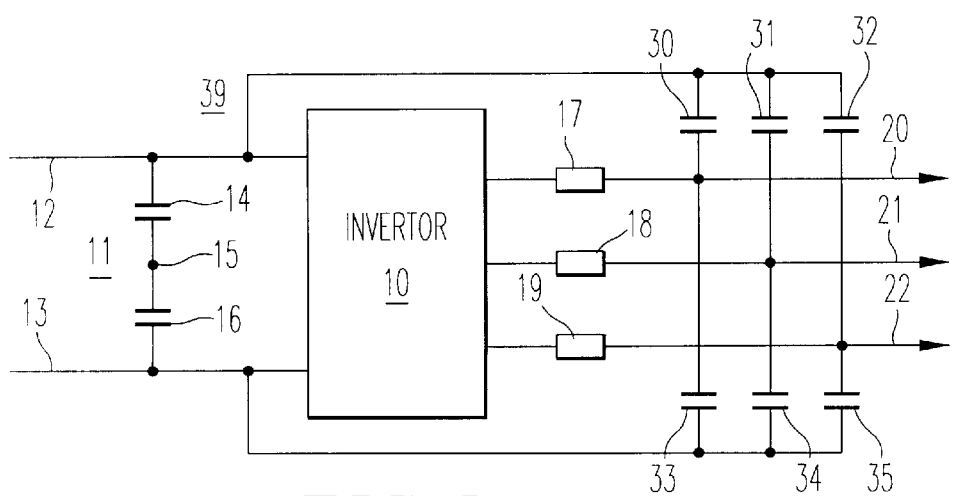
Figure 4:
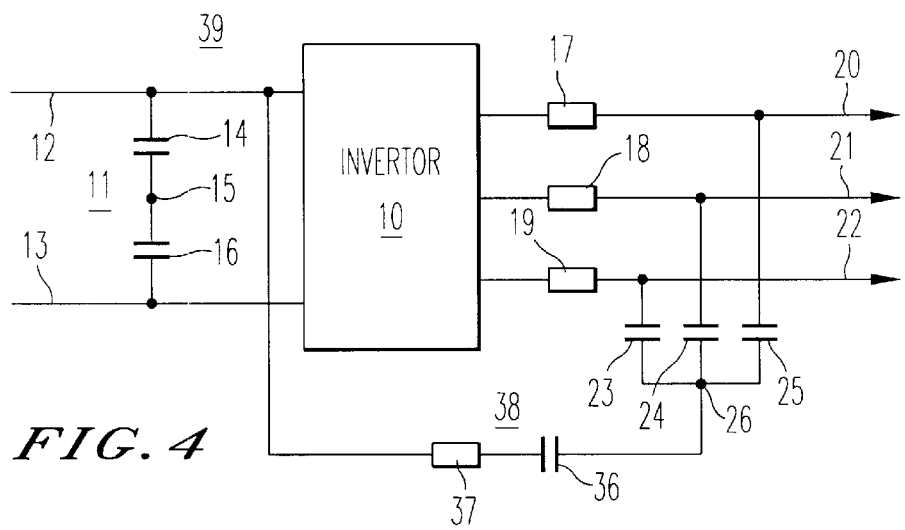
FIGS. 4–6 show various exemplary embodiments of a filter circuit according to the invention, the star point being connected to the voltage intermediate circuit at different points via the RC element.
Figure 5:
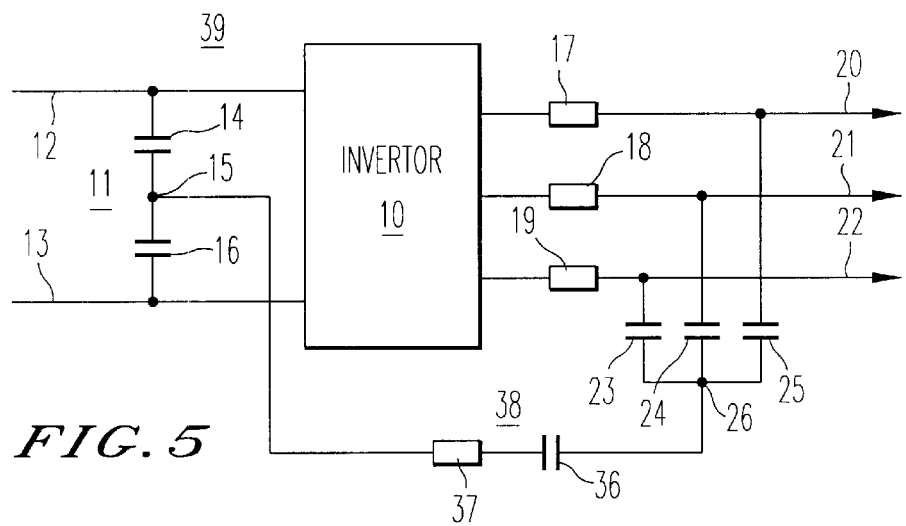
Figure 6:
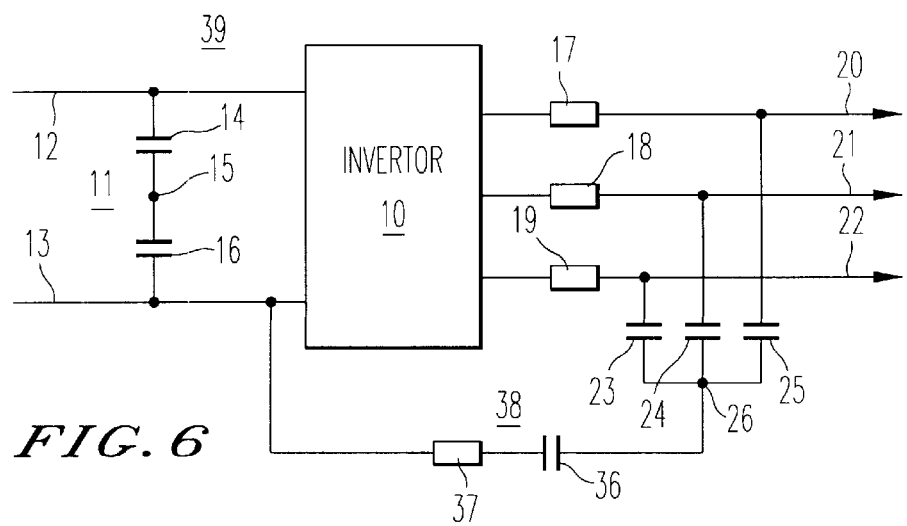

Referring now to the drawings, wherein like reference numerals designate identical or corresponding parts throughout the several views, FIG. 1 shows a circuit pertaining to the prior art. On the basis of this circuit, according to the invention, the capacitor star point 26 is connected (looped back) to the voltage intermediate circuit 11 via an RC element comprising a capacitor and a resistor. Although this does not completely eliminate the sudden changes in the DC component, they are limited to tolerable proportions (e.g. 500 V/$\mu$s). In accordance with the exemplary embodiments shown in FIGS. 4 to 6, the connection can be made at various points here. In FIG. 4, the capacitor star point 26 is looped back to the terminal 12 (positive terminal) of the voltage intermediate circuit 11 via the RC element 38 comprising the capacitor 36 and the resistor 37. In FIG. 6, the capacitor star point 26 is looped back to the terminal 13 (negative terminal) of the voltage intermediate circuit 11 via the RC element 38 comprising the capacitor 36 and the resistor 37. In FIG. 5, the center tap 15—if provided—of the intermediate circuit capacitors 14, 16 is used as the connection point for the RC element 38.

Various exemplary simulations have been carried out for a 1 MVA/4 kV converter connected in a three-point arrangement and operating at a switching frequency of 500 Hz with a filter circuit according to the invention. Using a capacitor 36 with a capacitance of 82.9 nF and a 603-ohm resistor 37, this produced losses of 341 watts and gradients dV/dt in the DC system of 495 V/$\mu$s.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters patent of the United States is:

1. A voltage converter having a voltage intermediate circuit and an invertor following on from the voltage intermediate circuit, which invertor produces a three-phase AC voltage at its outputs and is connected to output terminals of the voltage converter via a filter arrangement, the filter arrangement having associated with each output terminal a filter inductor, connected in series with the output terminal, and a filter capacitor which is connected between the output terminal and a common capacitor star point, wherein the capacitor star point is connected to the voltage intermediate circuit via an RC element having a capacitor and a resistor.

2. The voltage converter as claimed in claim 1, wherein the capacitance of the capacitor is very much lower than the capacitance of the filter capacitors.

3. The voltage converter as claimed in claim 1, wherein the capacitor star point is connected to a positive terminal of the voltage intermediate circuit via the RC element.

4. The voltage converter as claimed in claim 1, wherein the capacitor star point is connected to a negative terminal of the voltage intermediate circuit via the RC element.

5. The voltage converter as claimed in claim 1, wherein the voltage intermediate circuit has intermediate circuit capacitors with a center tap, and wherein the capacitor star point is connected to the center tap of the intermediate circuit capacitors via the RC element.

6. The voltage converter as claimed in claim 2, wherein the capacitor star point is connected to a positive terminal of the voltage intermediate circuit via the RC element.

7. The voltage converter as claimed in claim 2, wherein the capacitor star point is connected to a negative terminal of the voltage intermediate circuit via the RC element.

8. The voltage converter as claimed in claim 2, wherein the voltage intermediate circuit has intermediate circuit capacitors, with a center tap, and wherein the capacitor star point is connected to the center tap of the intermediate circuit capacitors via the RC element.

* * * * *